US012551158B2

(12) United States Patent
Eisenstein et al.

(10) Patent No.: US 12,551,158 B2
(45) Date of Patent: Feb. 17, 2026

(54) TRAUMATIC BRAIN INJURY DETECTION

(71) Applicant: The University of Birmingham, Birmingham (GB)

(72) Inventors: Neil Eisenstein, London (GB); Carl Banbury, Birmingham (GB); Michael Clancy, Birmingham (GB); Pola Goldberg Oppenheimer, Birmingham (GB); Richard Blanch, London (GB); Antonio Belli, Birmingham (GB); Ann Logan, Birmingham (GB)

(73) Assignee: The University of Birmingham, Birmingham (GB)

( * ) Notice: Subject to any disclaimer, the term of this patent is extended or adjusted under 35 U.S.C. 154(b) by 954 days.

(21) Appl. No.: 17/761,667

(22) PCT Filed: Sep. 18, 2020

(86) PCT No.: PCT/GB2020/052269
§ 371 (c)(1),
(2) Date: Mar. 18, 2022

(87) PCT Pub. No.: WO2021/053351
PCT Pub. Date: Mar. 25, 2021

(65) Prior Publication Data
US 2022/0338788 A1      Oct. 27, 2022

(30) Foreign Application Priority Data

Sep. 18, 2019   (GB) ...................................... 1913476

(51) Int. Cl.
*A61B 5/00*      (2006.01)
*A61B 3/00*      (2006.01)
(Continued)

(52) U.S. Cl.
CPC .......... *A61B 5/4064* (2013.01); *A61B 3/0025* (2013.01); *A61B 3/0083* (2013.01);
(Continued)

(58) Field of Classification Search
CPC ... A61B 5/4064; A61B 3/0025; A61B 3/0083; A61B 3/12; A61B 3/14; A61B 5/0075;
(Continued)

(56) References Cited

U.S. PATENT DOCUMENTS 8,326,405 B2    12/2012   Gellermann et al.
2002/0095257 A1  7/2002   Rosen et al.
(Continued)

FOREIGN PATENT DOCUMENTS

WO   WO2012123869 A2   9/2012
WO   WO 2018/106594 A2  6/2018
WO   WO 2019/100169 A1  5/2019

OTHER PUBLICATIONS

International Search Report for corresponding PCT Application No. PCT/GB2020/052269 dated Dec. 9, 2020.
(Continued)

*Primary Examiner* — Wen Huang
(74) *Attorney, Agent, or Firm* — Caesar Rivise, PC

(57) ABSTRACT

Apparatus for the non-invasive in-vivo determination of changes in tissue, e.g. the myelination, of the optic nerve (ON) in a biological subject, said apparatus comprising: a laser source for generating an excitation laser beam; an optical system including a fundus camera operatively associated with the laser source for use in obtaining a fundus image for illuminating the optic nerve (ON) of a subject with the excitation laser beam; a detector (13) operatively associated with the optical system and configured to detect a Raman spectrum from the optic nerve (ON) and/or surrounding cerebral spinal fluid; and a processor provided with
(Continued)

a computer program for comparing the detected Raman spectrum to at least one reference spectrum. The reference spectrum may correspond to the myelination of the optic nerve in a normal, healthy subject, for determining the changes in the myelination of the optic nerve of the subject based on the detecting and comparing steps from the Raman spectrum.

9 Claims, 4 Drawing Sheets

(51) Int. Cl.
    *A61B 3/12*     (2006.01)
    *A61B 3/14*     (2006.01)

(52) U.S. Cl.
    CPC .................. *A61B 3/12* (2013.01); *A61B 3/14* (2013.01); *A61B 5/0075* (2013.01); *A61B 5/4058* (2013.01); *A61B 5/6814* (2013.01); *A61B 5/6898* (2013.01)

(58) Field of Classification Search
    CPC .... A61B 5/4058; A61B 5/6814; A61B 5/6898
    See application file for complete search history.

(56) References Cited

U.S. PATENT DOCUMENTS

| | | |
|---|---|---|
| 2006/0134004 A1 | 6/2006 | Gellermann et al. |
| 2009/0149726 A1 | 6/2009 | Hyde et al. |
| 2012/0203086 A1 | 8/2012 | Rorabaugh et al. |
| 2020/0323480 A1* | 10/2020 | Shaked .................. G01N 1/30 |

OTHER PUBLICATIONS

Search Report for corresponding Great Britain Application No. GB1913476.6 dated Mar. 19, 2020.
Papa et al., "Serum Levels of Ubiquitin C-Terminal Hydrolase Distinguish Mild Traumatic Brain Injury From Trauma Controls and Are Elevated in Mild and Moderate Traumatic Brain Injury Patients With Intracranial Lesions and Neurosurgical Intervention", The Journal of Trauma and Acute Care Surgery, vol. 72, No. 5, pp. 1335-1344 (2012).
Dipietro et al., "Salivary MicroRNAs: Diagnostic Markers of Mild Traumatic Brain Injury in Contact-Sport", Frontiers in Molecular Neuroscience, vol. 11, Article 290 (2018).
Cheng et al., "Potential Biomarkers to Detect Traumatic Brain Injury by the Profiling of Salivary Extracellular Vesicles", Journal of Cellular Physiology, vol. 234, Issue 8, pp. 14377-14388 (2019).
Ermakov et al., "Macular Pigment Raman Detector for Clinical Applications", Journal of Biomedical Optics. vol. 9, No. 1, pp. 139-148 (2004).

* cited by examiner

TRAUMATIC BRAIN INJURY DETECTION

CROSS-REFERENCE TO RELATED APPLICATIONS

This application is a U.S. National Phase Application of PCT/GB2020/052269, filed Sep. 18, 2020, which claims priority to GB 1913476.6, filed Sep. 18, 2019, the contents of which applications are incorporated herein by reference in their entireties for all purposes.

BACKGROUND OF THE INVENTION

This invention relates generally to a method and apparatus for use in detecting traumatic brain injury. More specifically, although not exclusively, this invention relates to a to a non-invasive method and apparatus for use in detecting traumatic brain injury at the point-of-care.

Traumatic brain injury (TBI) caused by a head injury, for example in an accident, should be treated as a medical emergency. However, there is also growing concern for long term effects of mild traumatic brain injury (concussion) with evidence of cumulative effects from multiple sustained injuries. This is of particular concern to athletes and the military.

The standard methods used in hospital-based settings to detect TBI include imaging diagnostic tests such as computerized tomography (CT) scan, which uses a series of X-rays to create a detailed view of the brain to visualize fractures and uncover evidence of bleeding in the brain (haemorrhage), blood clots (hematomas), bruised brain tissue (contusions), and brain tissue swelling. Magnetic resonance imaging (MRI) may also be used to create a detailed view of the brain. However, these hospital-based systems are expensive, slow, and (for CT scans) expose patients to ionising radiation.

Moreover, even with powerful imaging systems, traumatic brain injuries can present without any detectable physiological or anatomical abnormalities. Consequently, patients are both under and over triaged in emergency services and A&E, with the additional complication that traumatic brain injury management is highly time sensitive.

Point-of-care diagnostics for traumatic brain injury is an area of active research. There have been several techniques published, which aim to provide an accurate, point-of-care diagnosis of traumatic brain injury. For example, an enzyme-linked immunosorbent assay (ELISA) has been developed by Papa et al. (J Trauma Acute Care Surg. 2012, 72(5):1335-44). This method cannot be classed as being 'non-invasive' because a blood sample is required.

Other examples of point-of-care diagnostics for TBI include the analysis of saliva samples, which can be obtained non-invasively, to detect micro RNA and extracellular vesicles (Di Pietro et al. Front Mol. Neurosci. 2018; 11:290 and Cheng, Yan, et al. J. Cell. Physiol. 2019 August; 234(8):14377-14388). However, these methods are not yet portable.

SUMMARY

It is therefore a first non-exclusive object of the invention to provide a method and apparatus for use in detecting suspected traumatic brain injury, which is both non-invasive, portable, and for use at the point of care, in order to guide or ascertain the need for clinical intervention.

A first aspect of the invention provides a method of analyzing an optic nerve of a subject, the method comprising:
  a. generating an excitation laser beam;
  b. causing the excitation laser beam to illuminate an optic nerve of a subject;
  c. detecting a Raman spectrum from the illuminated region of the optic nerve.

By compiling a series of Raman spectra from different subjects and/or from the same subject in different physical states, it is possible to build a library of spectra for subsequent use. The spectra may be collected in the fingerprint region (400-1800 cm-1) and/or non-fingerprint region of the spectrum. The spectra may be collected in the fingerprint region (500-1500 $cm^{-1}$) and/or non-fingerprint region of the spectrum.

The method may comprise illuminating the optic nerve with laser light in the range of 400-1100 nm.

Accordingly, a further aspect of the invention provides an in-vivo non-invasive method for determining changes in the tissue of the optic nerve in a biological subject, the method comprising the steps of:
  a. generating an excitation laser beam;
  b. causing the excitation laser beam to illuminate an optic nerve of a subject;
  c. detecting a Raman spectrum from the illuminated region of the eye;
  d. comparing the Raman spectrum from step c to at least one predetermined reference spectrum corresponding to the tissue of the optic nerve in a healthy subject;
  e. determining changes to the optic nerve of the subject based on step d.

In particular, step e may be used to determine changes in the myelination of the optic nerve.

It has been surprisingly found that Raman spectroscopy may be used to detect changes in the tissue of the optic nerve of a subject, e.g. a human or an animal patient. Raman scattering is probabilistically very low, e.g. only occurring for one in every one million scattering events. Raleigh scattering and fluorescence tend to dominate Raman spectra, which makes detection difficult. Accordingly, it is typical to use high photon densities (e.g. generated by a laser) to obtain a meaningful Raman spectrum. For obvious reasons, the optic nerve is an unlikely target for Raman spectroscopy. Surprisingly (and counterintuitively) it has been found that, using the method of the invention, the optic nerve may be used to allow changes in the tissue of the optic nerve to be detected. This information may be used to diagnose traumatic brain injuries.

It is known to perform Raman spectroscopy on certain regions of the eye. However, to our knowledge there is no disclosure of an in-vivo non-invasive method for determining the changes in the tissue of the optic nerve by obtaining a Raman spectrum of the optic nerve.

For example, US2002095257 describes an apparatus and method of performing Raman spectroscopy on the vitreous humour. However, this device is not capable of targeting the optic nerve. In addition, U.S. Pat. No. 8,326,405 B2 describes a method and apparatus for detection of carotenoids in macular tissue, which uses anti-fluorescence and resonance Raman spectroscopy (see also J. Biomed. Opt. 2004 January-February; 9(1): 139-148).

More advantageously, the method of the invention may be performed at the point-of-care, for example, in a primary care setting, in an Accident & Emergency hospital setting, and/or in an intensive care setting (e.g. for long-term, real-time monitoring in intensive care and/or during aftercare of the patient).

In embodiments, the method of the invention may be suitable for qualitatively and/or quantitatively determining changes in the tissue of the optic nerve in a biological subject. Advantageously, qualitative and/or quantitative analysis of the changes in the tissue of the optic nerve may be used to diagnose the severity of the traumatic brain injury, which may be used to better inform clinical decision making.

The Raman spectrum is taken of the optic nerve. Advantageously, this need not entail administering a fluorescent dye to the subject, which further demonstrates the non-invasive nature of the method.

In embodiments, the method of the invention may be suitable for determining changes in the myelination of the optic nerve in a biological subject. In embodiments, Step d. may comprise comparing the Raman spectrum from the detecting step to at least one predetermined reference spectrum corresponding to the myelination of the optic nerve in a normal, healthy subject.

Surprisingly, changes in the myelination of the optic nerve, for example, the level of demyelination (that is, the level of damage to the myelin sheath of the optic nerve) may be used to diagnose and/or quantitatively detect a traumatic brain injury in a biological subject. The method of the invention enables these changes to be detected in-vivo, in a non-invasive manner, such that traumatic brain injury may be diagnosed to inform clinical decision making.

In embodiments, the method of the invention further comprises Step f. using a fundus camera to obtain an image of the retina and/or optic nerve of the eye of the subject. In embodiments, the method of the invention further comprises Step g. using the fundus image to guide illumination the optic nerve of the subject with the laser beam. In embodiments, Step f. and Step g. are performed simultaneously. In embodiments, Step f. and Step g. are performed sequentially. In embodiments, Step f. and Step g. are performed after Step a. and before Step b.

Surprisingly, the inventors have found that a fundus image enables the excitation laser beam to be accurately focused into the eye such that the optic nerve (or a portion thereof) is illuminated by the laser beam. This enables a Raman spectrum of the optic nerve and the associated (e.g. surrounding) cerebral spinal fluid to be recorded non-invasively and in real-time. By comparison with predetermined spectra, any changes in the tissue of the optic nerve, e.g. changes in the myelination of the optic nerve and/or changes in the amount or type of biomarkers (e.g. biomarkers of traumatic brain injury, for example, present in the cerebrospinal fluid); that deviate from a normal, healthy subject, may be determined, which may be used to detect traumatic brain injury in the subject. The results of this method may be used to guide the need for or type of clinical intervention.

The fundus camera may provide an image. The method may comprise moving, e.g. rastering the laser beam across the optic nerve to obtain Raman spectra from different locations on the optic nerve. Control circuitry may be provided to raster the laser beam across the subject's optic nerve.

In embodiments, the excitation laser beam has a wavelength greater than 400 nm. In embodiments the wavelength is from 400 nm to 1100 nm or 1200 nm. In embodiments, the wavelength of the excitation laser is within the visible light spectrum, e.g. between 400 nm to 750 nm. In embodiments, the excitation laser beam has a wavelength of 635 nm. The method includes illuminating the eye with laser light in the above wavelength ranges.

In embodiments, the excitation laser beam may be continuous. Alternatively, the excitation laser beam may be pulsed.

In embodiments, Step e. of the method may comprise comparing Raman bands, e.g. between 2000 to 3500 cm$^{-1}$, within the Raman spectrum from the detecting step to at least one predetermined reference spectrum corresponding to the myelination of the optic nerve in a normal, healthy subject. The method of the invention may be used to compare Raman bands within the Raman spectrum from the detection step with more than one predetermined reference or comparative spectrum, e.g. more than ten reference or comparative spectra, or more than one hundred reference or comparative spectra, for example, several hundred reference or comparative spectra or more than one thousand, or several thousand reference or comparative spectra, e.g. corresponding to the myelination of the optic nerve in a normal, healthy subject. Advantageously, machine learning may be used to refine the method of the invention such that it is better able to determine changes to the optic nerve of the subject. The greater the data set of predetermined reference or comparative spectra, the more effective the machine learning will be. In this way, the method may be constantly refined to enable useful information to be provided, e.g. for diagnostic purposes in traumatic brain injury detection.

For example, by comparing spectra from healthy subjects and those which have presented with traumatic brain injury (or spectra from those subjects which are subsequently diagnosed with TBI) it is possible to determine symptomatic differences in the spectra of a subject.

In embodiments, the method may comprise comparing Raman bands in the non-fingerprint segment of the spectrum, for example between 2700 to 3200 cm$^{-1}$, for example between 2800 to 2900 cm$^{-1}$, e.g. at 2850 cm$^{-1}$, within the Raman spectrum from the detecting step to at least one predetermined reference spectrum corresponding to the tissue, e.g. the myelination, of the optic nerve in a normal, healthy subject.

It has been surprisingly found that using visible excitation light allows a resonance Raman signal to be detected.

More surprisingly, the method according to embodiments of the invention may be carried out without comparing the "fingerprint" region of the Raman spectrum. Instead, the high wavenumber resonance Raman signals at between 2500 to 3000 cm$^{-1}$ may be used to determine the changes in the tissue, e.g. the myelination, of nerve fibres in the optic nerve in a biological subject. This region provides a clear indication of tissue changes, which may be used to diagnose traumatic brain injury and/or to inform clinical decisions. It has been surprisingly found that this less well understood region of the Raman spectrum may be used to obtain diagnostically useful information. This is particularly surprising because the high wavenumber resonance region contains fewer peaks in comparison with the fingerprint region.

The inventors have surprisingly found that it is possible to determine a difference in myelinated and unmyelinated optic nerve tissue using Raman spectroscopy of the optic nerve. The inventors believe that traumatic brain injury, for example, repetitive mild traumatic brain injury, causes demyelination of optic nerve tissue.

In embodiments, Step g. of the method may further comprise using the fundus image to target the excitation laser beam through a short pass filter and into the eye of the subject so that the optic nerve is illuminated.

The inventors found that the white light used for fundus imaging may overwhelm and/or cause interference with the resonance Raman measurements. This is because Raman events have a very low probability. However, use of a short pass filter which mitigates this issue has a greater than 98% efficiency transmitting in the region of 400-600 nm (e.g. an LED white light flash) and a similar efficiency at reflecting light with a wavelength of greater than 625 nm (e.g. input laser and Raman scatter). This allows efficient coupling of the fundus camera and Raman spectrometer without crosstalk. A specific type of short pass filter which may be used to mitigate this problem is a 625 nm edge BrightLine® single-edge short-pass standard epi-fluorescence dichroic beamsplitter, Part Number: FF625-SDi01-25×36 from IDEX Health & Science LLC (Center of Excellence, 1180 John Street, Rochester, New York 14586). This filter provides >90% transmission in the visible light range, and from 400-620 nm, which allows visible illumination from the LED white light flash. The filter also provides >98% reflection at 45 degrees from 635 to 850 nm, which efficiently reflects the excitation laser beam and backscattered Raman signal, whilst effectively removing the white light source from the optical path of the Raman system. This is surprising because the short pass filter that may be used in the method of the invention is designed for use in epifluorescence studies and would not usually be considered for Raman spectroscopy. Indeed, because this type of high efficiency filter has been designed with a specific epifluorescence application in mind, it is unexpected that it would be usable in such a Raman application outside the wavelength range it was designed to work within. However, the inventors have surprisingly found that although the performance for the Fundus camera in the visible wavelength is not optimized, the performance in reflecting the laser light and Raman signal is satisfactory. Accordingly, the use of this type of short pass filter is able to simultaneously record fundus image and allow the recording of a Raman spectrum.

An aspect of the invention provides an apparatus for the non-invasive in-vivo determination of changes in the tissue, e.g. the myelination, of the optic nerve in a biological subject, said apparatus comprising:
i. a laser source for generating an excitation laser beam;
ii. an optical system for directing the excitation beam onto the optic nerve of a subject and for directing scattered light received from the optic nerve;
iii. a detector operatively associated with the optical system and configured to receive the scattered light to detect a Raman spectrum from the tissue of the optic nerve of a subject; and
iv. a processor operable to compare the detected Raman spectrum to at least one reference spectrum of an optic nerve of a normal, healthy subject.

The processor may be operable to determine changes in the myelination of the optic nerve of the subject based on the comparison of the detected Raman spectrum and the reference spectrum.

The apparatus may further comprise a fundus camera. The optical system may comprise a fundus camera. The fundus camera maybe operatively associated with the laser for use in obtaining a fundus image the optic nerve. The fundus camera may be operable or allow focusing of the excitation laser beam onto a region of the optic nerve of the eye of a subject.

A further aspect of the invention provides an apparatus for the non-invasive in-vivo determination of changes in the tissue, e.g. the myelination, of the optic nerve in a biological subject, said apparatus comprising:
i. a laser source for generating an excitation laser beam;
ii. an optical system including a fundus camera operatively associated with the laser for use in obtaining a fundus image for focusing the excitation laser beam onto a region of the optic nerve of the eye of a subject;
iii. a detector operatively associated with the optical system and configured to detect a Raman spectrum from the tissue of the optic nerve and surrounding cerebral spinal fluid; and
iv. a processor operable for comparing the detected Raman spectrum to at least one reference spectrum, preferably corresponding to the myelination of the optic nerve in a normal, healthy subject, for determining the changes in the myelination of the optic nerve of the subject based on the detecting and comparing steps from the Raman spectrum.

The processor may be operable to compare the detected spectrum and reference spectrum in the non-fingerprint segment of the spectrum, for example above 1500 $cm^{-1}$, say from 2000 $cm^{-1}$ to 3500 $cm^{-1}$.

The apparatus may further comprise a short pass filter. The apparatus may be configured to enable the excitation laser beam to pass through the short pass filter before entering the eye to illuminate the optic nerve.

In embodiments, the laser source may comprise a class I laser, for example emitting laser light above 400 nm wavelength, for example between 400 nm and 1200 nm. In embodiments the laser may emit light at a wavelength of 635 nm. The laser may be a diode laser. Advantageously, a class I laser source is certified as being safe for use in eyes.

In embodiments, the optical system may comprise hand held computing device with a fundus camera attachment. In embodiments, the handheld computing device is a tablet computer or a smartphone. The handheld computing device may be operable to provide white light illumination.

In embodiments, the optical system may further comprise an optical system, for example an optical system comprising one or more short pass filters, one or more long pass filters and the like. The short pass filter or filters and/or long pass filter or filters will be chosen according to the wavelength of the laser light.

In embodiments, the optical system may further comprise a filter, e.g. a long pass filter, for example a 635 nm long pass dichroic mirror filter, configured to reflect light emitted from the excitation laser source, and to transmit resonance Raman scattered light from the optic nerve.

In embodiments, the filter may comprise a beam splitter, for example a multiphoton single-edge dichroic beam splitter, e.g. a 735 nm multiphoton single-edge dichroic beam splitter, for example, a 735 nm edge BrightLine® multiphoton single-edge dichroic beam splitter from IDEX Health & Science LLC (Center of Excellence, 1180 John Street, Rochester, New York 14586). Advantageously, using a filter of this type enables the use of a standard 1064 nm Raman spectrometer so that Raman spectra may be measured using a excitation laser beam having a longer wavelength.

More advantageously, excitation at long wavelengths, for example infrared wavelengths, in particular near IR wavelengths, e.g. 800-1200 nm, for example at 1064 nm, provides measurements absent fluorescence. Advantageously, Raman spectra measured using such longer wavelengths allows access to, and is capable of providing a more detailed picture from the fingerprint region.

In embodiments, the optical system may further comprise a filter, e.g. a long pass filter, for example a 650 nm long pass filter, configured to transmit resonance Raman scattered light of a specific wavelength, from the optic nerve to the detector.

The apparatus may comprise a controller operable to move, e.g. raster, the excitation laser beam across the optic nerve of the subject.

The controller may be operable by a doctor, optician or other caregiver. In embodiments that controller is operable to move the excitation laser beam across the optic nerve of the subject under the control of a or the processor. The movement of the excitation laser beam across the optic nerve may be conducted by reference to one or more images obtained by the fundus camera.

In embodiments the fundus camera may continuously or periodically provide an image of the optic nerve.

In embodiments, the apparatus further comprises a support, for example, a support configured to hold the laser source, the optical system including the fundus camera and/or the detector.

The support may further comprise a head mount to mount to the head of a patient.

Advantageously, the support enables the apparatus to be used on a patient who may be unconscious or semi-conscious to keep the apparatus and its components stationary in relation to one another such that an accurate reading may be obtained.

The apparatus may be sized such that it is portable. This enables the apparatus to be used at the point-of-care, e.g. in a primary care setting. Advantageously, the use of a detector, e.g. a Raman spectrometer, that is portable produces no reduction in quality of the Raman spectrum in comparison with larger, e.g. laboratory-based, detectors.

Advantageously, the method and apparatus of the invention does not require invasive acquisition of bodily fluids to perform a diagnostic test. Moreover, there is no need for application of a dye, contrasting agent or otter species before use. Further, there is no need for sample preparation before the test can be performed. This reduces the amount of time required to perform a test. Moreover, the method and apparatus according to the invention may be used to obtain real-time results.

Advantageously, the method and apparatus of the invention may be performed by a third party, e.g. on an unconscious subject, without the need for the subject themselves to focus or aim the light source.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION

Figure 1:
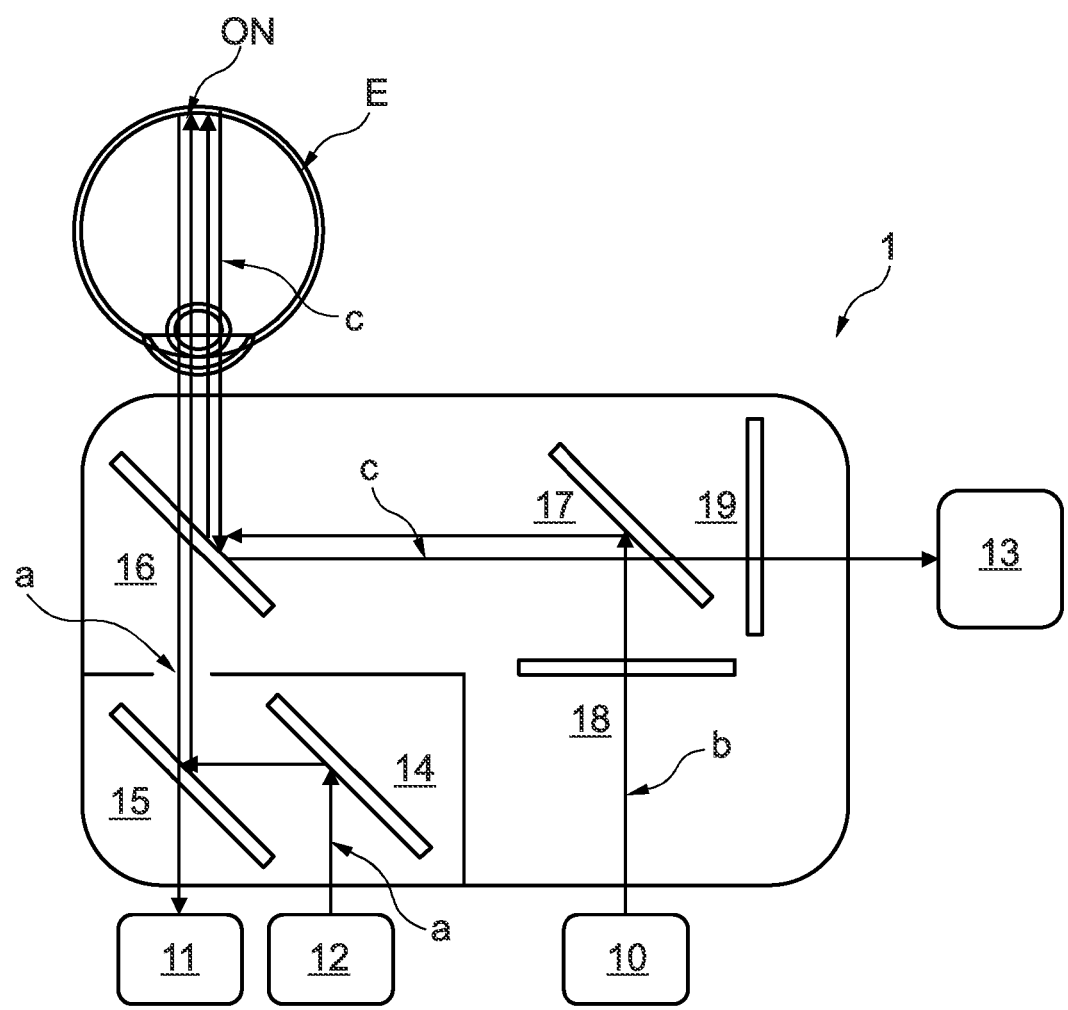
FIG. 1 is a schematic representation of an apparatus according to an embodiment of the invention.

Referring now to FIG. 1, there is shown an apparatus 1 for obtaining a Raman spectrum of the optic nerve ON of an eye E according to an embodiment of the invention. The apparatus is for use in non-invasive in-vivo determination of changes in the myelination of the optic nerve in a biological subject.

The apparatus 1 comprises a laser source 10, a fundus camera 11, a white light source 12, and a detector 13. The apparatus 1 further comprises a mirror 14, a beam splitter 15, a first dichroic mirror filter 16, a second dichroic mirror filter 17, a laser line filter 18, and a Rayleigh filter 19.

There is shown a white light path 'a' from the white light source 12 to the optic nerve ON for use by the fundus camera 11. There is also shown a laser light path 'b' from the laser source 10, and a Raman light path 'c' from scattering of the excitation laser light from the laser source 10.

In use, the white light source 12 provides white light, which follows the path a. The white light is reflected from the mirror 14 and the beam splitter 15 sequentially to reach the optic nerve ON of the eye E. Simultaneously, the laser source 10 also provides an excitation laser beam, which follows path b. The white light is used by the fundus camera 11 to obtain an image (not shown) of the optic nerve ON of the eye E. The image (not shown) is used to focus the excitation laser beam into the eye E so that the optic nerve ON is illuminated. The Raman scattered light from the optic nerve ON, following path c, is then detected by the detector 13. A processor (not shown) is used to compare the recorded Raman spectrum to at least one predetermined reference spectrum corresponding to an 'healthy' state of the optic nerve, for example the myelination of the optic nerve in a normal, healthy subject. This information is usable to determine any changes in the state (e.g. myelination) of the optic nerve, which may be used to detect traumatic brain injury and to guide the need for or type of clinical intervention.

The inventors have found that obtaining a fundus image of the optic nerve is essential to recording a usable Raman spectrum. This is because fundus image enables the excitation laser beam to be accurately focused into the eye such that the optic nerve is illuminated.

Advantageously, this enables a Raman spectrum of the optic nerve and the surrounding cerebral spinal fluid to be recorded non-invasively and in real-time.

The processor (not shown) may undergo "machine learning". The processor may have the ability to automatically categorize Raman spectra of an optic nerve of the same or different subjects, recorded in previous tests without being explicitly programmed.

Figure 2:
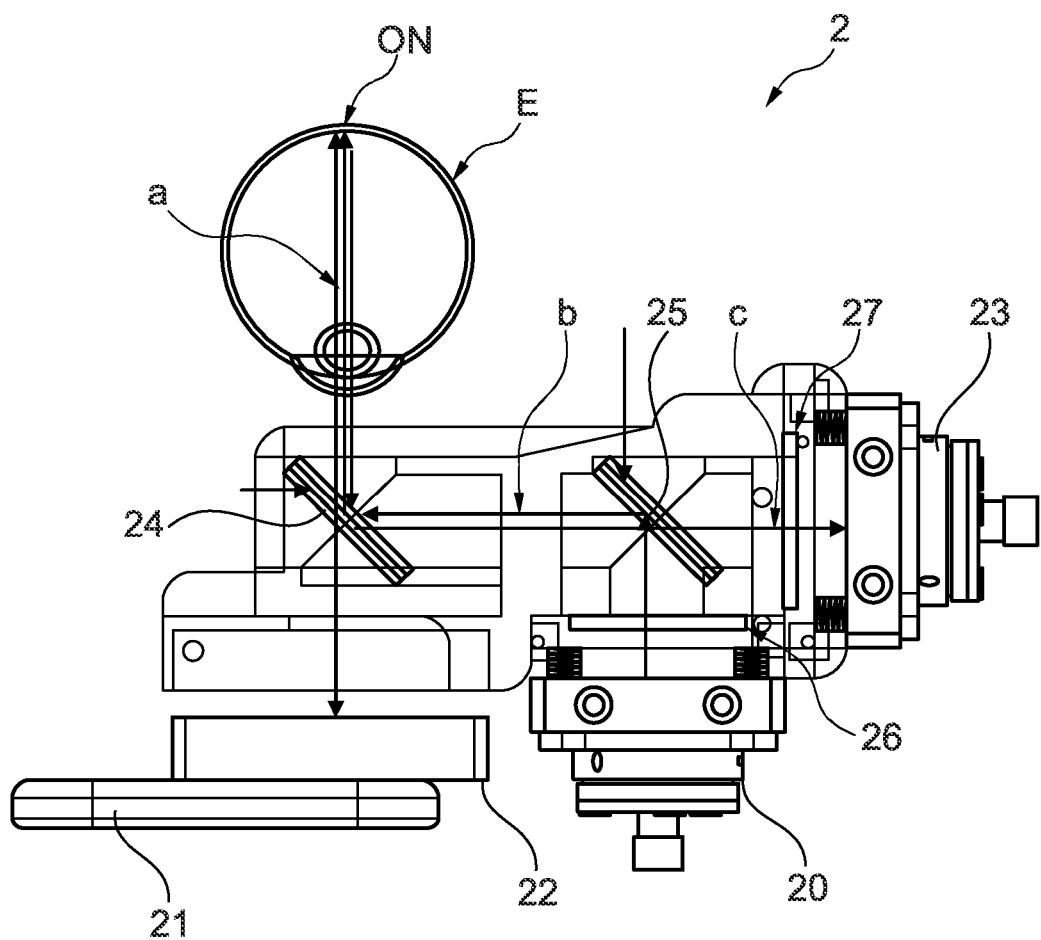
FIG. 2 is a schematic representation of an apparatus according to a further embodiment of the invention.

Referring now to FIG. 2, there is shown an apparatus 2 according to a second embodiment of the invention.

In this embodiment, the apparatus 2 comprises a laser source 20, a smart phone 21 with a fundus camera attachment 22, and a detector 23.

The apparatus 2 further comprises a first dichroic mirror filter 24, a second dichroic mirror filter 25, a laser line filter 26, and a filter 27.

There is also shown the white light path 'a', the laser light path 'b', and the Raman light path 'c', as described for FIG. 1.

The laser source 20 is a 635 nm Class I eye-safe laser comprising an FC/PC FibrePort and mount. The smart phone 21 is an iPhone 7® and the fundus camera attachment 22 was purchased from D-EYE® (77 35131 Padova PD-Italy). The detector 23 comprises an SMA fibre port and mount lead to a QE Pro® 635 spectrometer.

The first dichroic mirror filter 24 is a 635 nm short pass dichroic mirror, the second dichroic mirror filter 25 is a 635 nm long pass dichroic mirror, the laser line filter 26 is a 635 nm laser line filter, and the filter 27 is a 650 nm long pass filter.

The apparatus 2 functions in a similar manner to that described for FIG. 1. The white light is provided by the smart phone 21 for the fundus camera attachment 22 to obtain an image of the optic nerve ON.

Advantageously, the first dichroic mirror filter (16; 24) is operable to allow the Raman spectrometer (detector 13, 23) and the fundus camera (12, 22) to be used together This is because the filter (16, 24) transmits the low wavelength, visible light used for fundus imaging whilst reflecting the high wavelength laser and Raman scattered light.

Figure 3A:
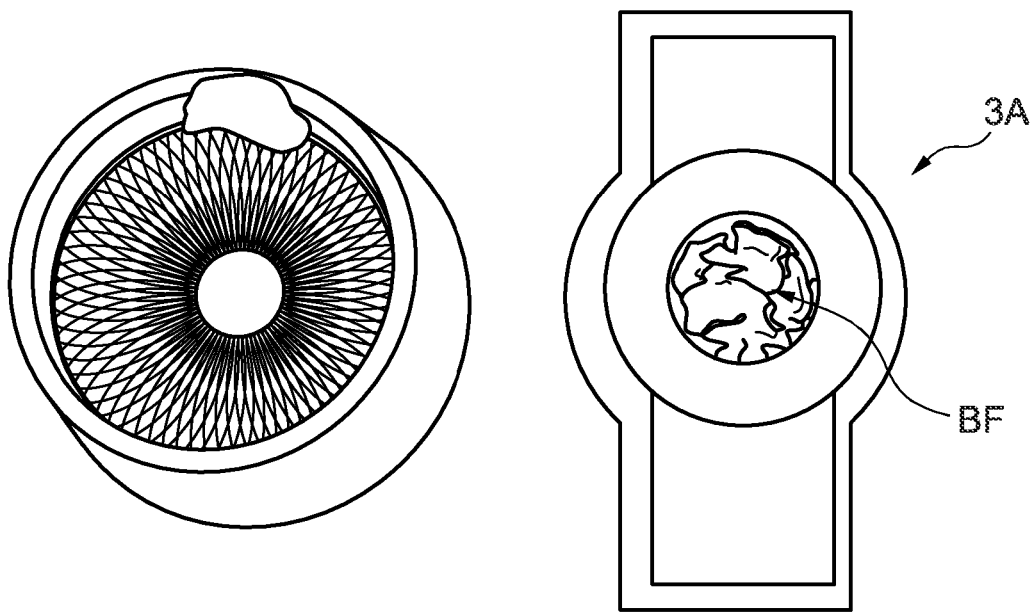
FIG. 3A is shown an eye model comprising bacon fat for testing the method and apparatus of the invention.
Figure 3B:
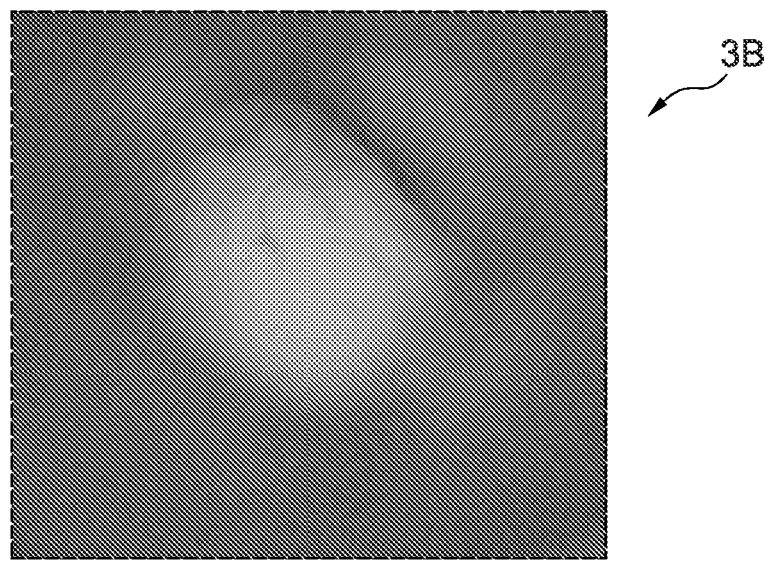
FIG. 3B is a fundus image of the bacon fat of FIG. 3A.

Referring now to FIG. 3A, there is shown an eye model 3A comprising bacon fat BF. This was designed to mimic the fatty tissue that makes up the optic disk. Referring also to FIG. 3B, there is shown a fundus image 3B obtained using the apparatus 2 of FIG. 2 of the bacon fat in the eye model 3A of FIG. 3A.

Figure 4:
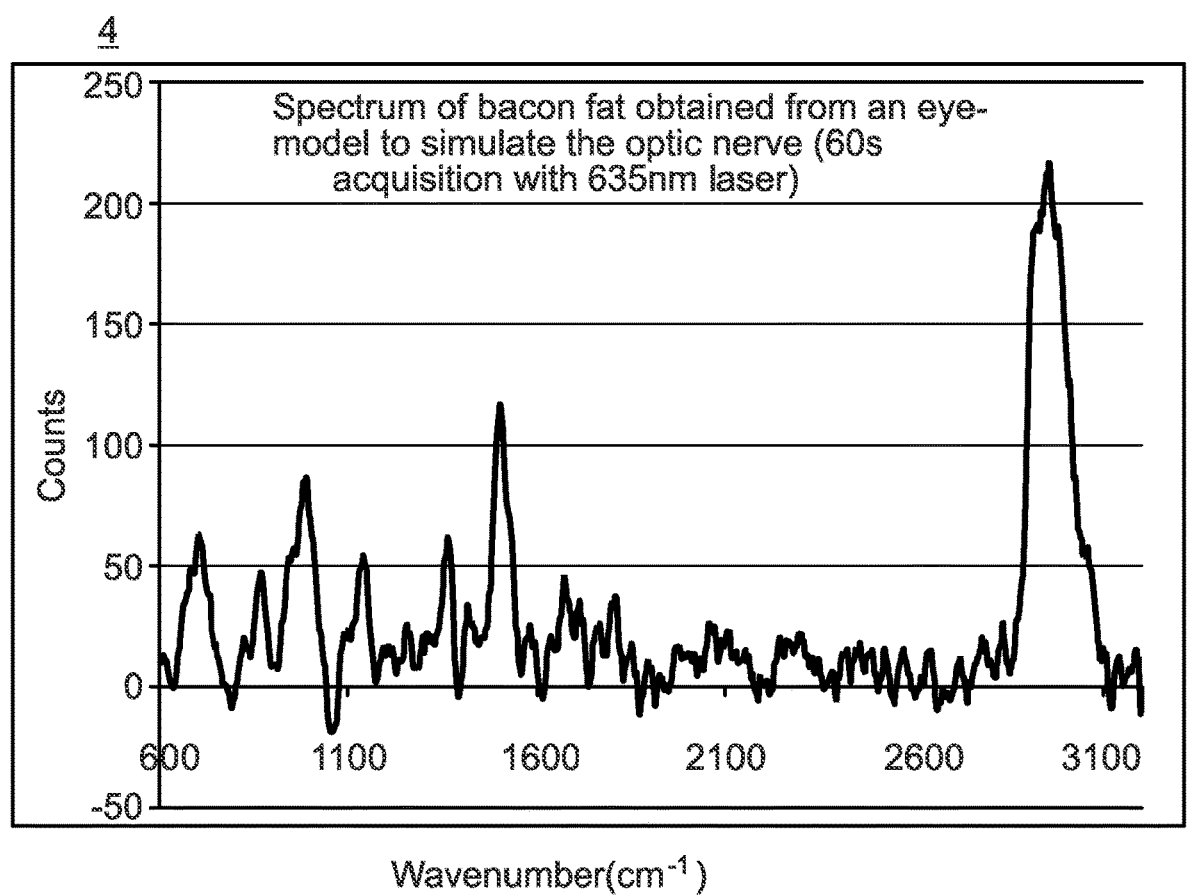
FIG. 4 is a Raman spectrum of the bacon fat of FIG. 3A, recorded with the apparatus of FIG. 2.

Referring now to FIG. 4, there is shown a Raman spectrum 4 obtained using the apparatus of FIG. 2. The Raman spectrum 4 was recorded using bacon fat in the eye model shown in FIG. 3 using 60 s acquisition with a 635 nm laser.

Once a Raman spectrum of the optic nerve of the eye is obtained using the apparatus it is possible to compare the spectrum, e.g. visually or automatically, with a library spectrum to determine if a specific signature signal (i.e. one or more characteristic Raman peaks) is present. Once the absence or presence of a specific signature signal has been detected methods may be deployed to quantify the reduction or increase in the specific signature signal to determine a deviation vis-à-vis the library spectrum and thence infer or calculate a condition.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

The invention claimed is:

1. Apparatus for the non-invasive in-vivo determination of changes in tissue of the optic nerve in a biological subject, said apparatus comprising:
   i. a laser source for generating an excitation laser beam;
   ii. an optical system including a fundus camera operatively associated with the laser source for use in obtaining a fundus image for illuminating the optic nerve of a subject with the excitation laser beam;
   iii. a detector operatively associated with the optical system and configured to detect a Raman spectrum from the optic nerve and/or surrounding cerebral spinal fluid; and
   iv. a processor operable to compare the detected Raman spectrum to at least one reference Raman spectrum of an optic nerve and/or surrounding cerebral spinal fluid of a healthy subject, the reference spectrum corresponding to the myelination of the optic nerve in a normal, healthy subject, for determining the changes in the myelination of the optic nerve of the subject based on the detecting and comparing steps from the Raman spectrum, wherein the processor is operable to compare the detected Raman spectrum to the reference Raman spectrum in a non-fingerprint region of the spectrum from 2000 $cm^{-1}$ to 3500 $cm^{-1}$, wherein the optical system further comprises: a short pass dichroic mirror filter configured to transmit visible light for obtaining the fundus image whilst reflecting laser and Raman scattered light; and a long pass dichroic mirror filter configured to reflect light emitted from the excitation laser source and to transmit resonance Raman scattered light.

2. Apparatus according to claim 1, wherein the laser source comprises a class I laser capable of emitting laser light above 400 nm wavelength.

3. Apparatus according to claim 1, wherein the optical system comprises a hand-held computing device with a fundus camera attachment, and the hand-held computing device is one of a tablet computer and a smartphone.

4. Apparatus according to claim 3, wherein the hand-held computing device is operable to provide white light illumination.

5. Apparatus according to claim 1, wherein the optical system comprises at least one further short pass filters, and at least one further long pass filters.

6. Apparatus according to claim 1, further comprising a support configured to hold the laser source, the optical system including the fundus camera and the detector.

7. Apparatus according to claim 1, further comprising a head mount to mount at least the optical system and a fundus camera to the head of a patient.

8. Apparatus according to claim 1, comprising a controller operable to move the excitation laser beam across the optic nerve of the subject.

9. Apparatus according to claim 8, wherein the controller is operable to move the excitation laser beam across the optic nerve of the subject by reference to an image obtained by the fundus camera.

* * * * *